J. D. LAUERMAN.
CAN RECEPTACLE AND OPENER.
APPLICATION FILED MAR. 12, 1919.

1,307,908.

Patented June 24, 1919.

Inventor
John D. Lauerman
By D. A. Gourick
Attorney

UNITED STATES PATENT OFFICE.

JOHN D. LAUERMAN, OF LAKE HOPATCONG, NEW JERSEY.

CAN RECEPTACLE AND OPENER.

1,307,908.             Specification of Letters Patent.   Patented June 24, 1919.

Application filed March 12, 1919. Serial No. 282,078.

*To all whom it may concern:*

Be it known that I, JOHN D. LAUERMAN, a citizen of the United States, residing at Lake Hopatcong, in the county of Morris and State of New Jersey, have invented certain new and useful Improvements in Can Receptacles and Openers, of which the following is a specification.

This invention relates to table articles and has for its object the provision of a receptacle or holder for a can of evaporated milk, this receptacle being provided with a cover carrying can opening members whereby a can disposed within the receptacle will have its top perforated in two places so as to permit pouring out the contents of the can.

An important object is the provision of a device of this character in which the cover is hinged upon the receptacle and securable thereon, this cover carrying two penetrating members adapted to enter the top of the can, one serving to provide an air vent and the other serving as a spout to facilitate pouring out the contents of the can.

Another object is the provision of a device of this character which is so constructed that the position of the discharge spout is such that it will be in non-obstructing relation to the hand of the operator when his palm is pressed onto the cover for forcing the penetrating members into the can.

A further object is the provision of a device of this character which is provided with a handle which will consequently have the same advantages as a pitcher when pouring out the contents of the can; which will be simple and inexpensive in manufacture, easy to use, durable in service, and a general improvement in the art.

With the above and other objects in view, the invention consists in the details of construction to be hereinafter more fully described and claimed, and illustrated in the accompanying drawing, in which:

Figure 1:
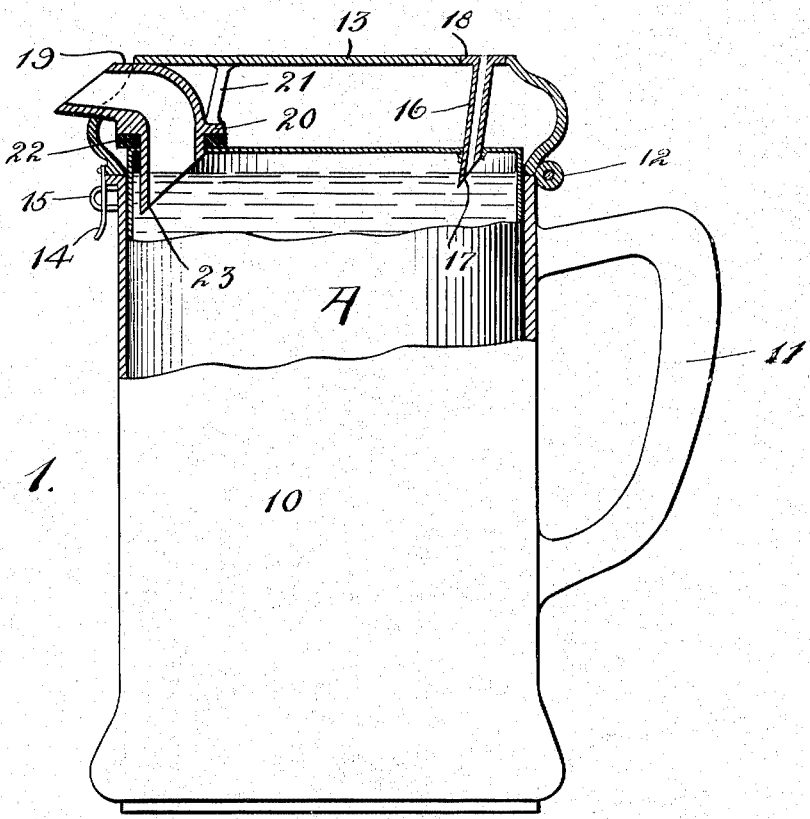
Figure 1 is a longitudinal sectional view with the cover closed.
Figure 2:
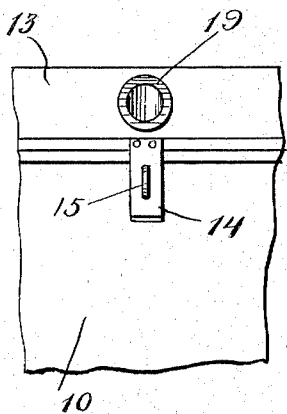
Fig. 2 is a fragmentary front elevation.
Figure 3:
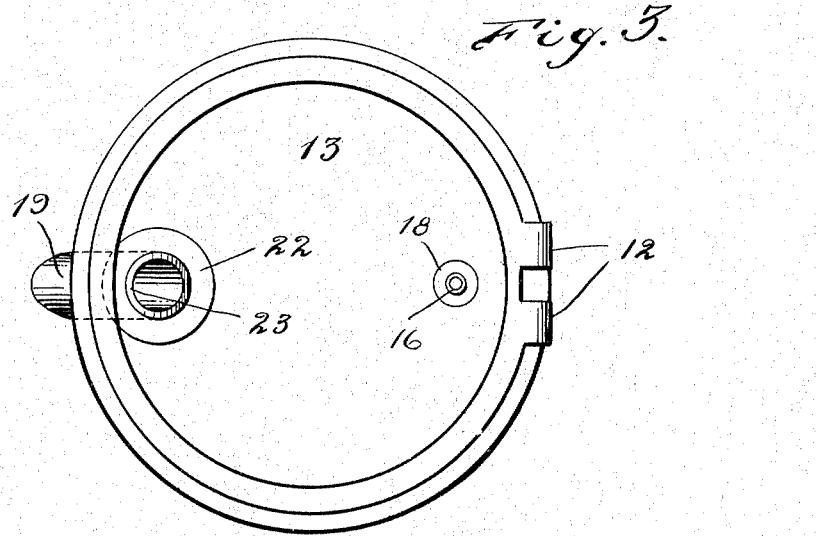
Fig. 3 is a bottom or inside plan view of the cover.

Referring more particularly to the drawings, the numeral 10 designates a receptacle which is cylindrical in form and in the nature of a pitcher. This receptacle is provided upon one side with a handle 11 and is of slightly less height than the can A of evaporated milk, or the like, disposable therein.

Hinged, as shown at 12, upon the receptacle 10 immediately above the handle 11 is a cover 13 which carries a spring hasp 14 engaging over a staple 15 on the receptacle for locking the cover in closed position.

Secured upon the underside of the cover 13 is a penetrating member in the nature of a tube 16 which has a sharpened point 17 and an enlarged head 18 secured to the cover. The bore of this tube extends through the head so that when this tube is pressed into the can, as hereinafter described, air will be admitted into the can.

Secured within the cover at a point diametrically opposite the tube 16 is a spout 19 which is curved so that its discharge end will extend through one side of the cover so as to be in non-obstructing relation when the hand of the operator is placed upon the cover. Intermediate its ends the spout is provided with a flange 20 which is engaged by a brace 21 secured to the underside of the cover. Disposed against the underside of the flange is a gasket 22. At its lower end the spout 19 is diagonally cut away to provide a penetrating point 23.

In the use of the device, a can A is placed within the receptacle, after which the operator swings the cover toward its closed position and presses firmly with the palm of his hand upon the top of the cover. The tubular member 16 and the lower end of the spout 19 will then penetrate the top of the can as shown in Fig. 1, after which the hasp 14 is engaged upon the staple 15. The device may be used in the same manner as a pitcher. When the device is properly tilted, the contents of the can will pour out of the spout 19, air entering through the tube 16. When the can is empty the cover is opened and the can removed by grasping the end thereof which projects above the top. Another can is then inserted.

From the foregoing description and a study of the drawings it will be apparent that I have provided a device whereby a can of evaporated milk or the like may be very easily properly perforated and subsequently handled for pouring out the contents of the can.

While I have shown and described the preferred embodiment of the invention, it will of course be understood that I reserve the right to make such changes in the form, construction, and arrangement of parts as will not depart from the spirit of the invention or the scope of the subjoined claim.

Having thus described my invention, what I claim is:

A devce of the character described comprising a handled receptacle adapted to receive a can, a flanged cover for said receptacle hinged thereon, a tubular member extending from the underside of said cover adjacent its point of hinging and having a sharp can penetrating end, a substantially L shaped spout disposed within said cover and having a discharge end extending through the flange thereof at a point diametrically opposite said point of hinging and said tubular member, the other end of said spout extending downwardy below the flange of and at right angles to said cover and being diagonally cut away to provide a point adapted for penetrating engagement with the top of a can, and a bracing member extending from said cover and connected with said spout.

In testimony whereof I hereto affix my signature.

JOHN D. LAUERMAN.